(12) United States Patent
Arnault et al.

(10) Patent No.: US 9,989,106 B2
(45) Date of Patent: Jun. 5, 2018

(54) CLUTCH RELEASE BEARING DEVICE AND MOTOR VEHICLE EQUIPPED WITH SUCH A BEARING

(71) Applicants: Benoit Arnault, Saint-Cyr-sur-Loire (FR); Eric Baudez, Fondettes (FR)

(72) Inventors: Benoit Arnault, Saint-Cyr-sur-Loire (FR); Eric Baudez, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/090,768

(22) Filed: Apr. 5, 2016

(65) Prior Publication Data

US 2016/0298699 A1 Oct. 13, 2016

(30) Foreign Application Priority Data

Apr. 7, 2015 (FR) ...................................... 15 52942

(51) Int. Cl.
*F16D 23/14* (2006.01)

(52) U.S. Cl.
CPC ......... *F16D 23/147* (2013.01); *F16D 23/143* (2013.01)

(58) Field of Classification Search
CPC .............................. F16D 23/147; F16D 23/143
See application file for complete search history.

(56) References Cited

U.S. PATENT DOCUMENTS

| 4,119,187 A * | 10/1978 | Ernst ...................... F16D 23/14 |
| | | 192/110 B |
| 6,464,060 B1 * | 10/2002 | Ponson ................. F16D 23/142 |
| | | 192/110 B |
| 2005/0236250 A1 | 10/2005 | Riess |

FOREIGN PATENT DOCUMENTS

| EP | 1420184 A1 | 5/2004 |
| EP | 2703673 A1 | 3/2014 |
| GB | 1567379 A | 5/1980 |

* cited by examiner

*Primary Examiner* — Jacob S. Scott
*Assistant Examiner* — Timothy Hannon
(74) *Attorney, Agent, or Firm* — Bryan Peckjian; SKF USA Inc, Patent Dept.

(57) ABSTRACT

The invention relates to a motor vehicle clutch release bearing device including a rolling bearing that forms a member for transmitting an axial force, having a rotating ring and a non-rotating ring, between which a rolling chamber for rolling elements is defined. The rotating ring provides a first radial portion intended to come into contact with an actuating member when a sufficient axial force is applied to the non-rotating ring by a member that is able to move in translation, and a second radial portion that is intended to bear against a spring, which exerts an axial force in the opposite direction to the axial force exerted by the member that is able to move in translation, dedicated to preloading the rolling bearing in an opposite direction to the actuating member.

8 Claims, 4 Drawing Sheets

CLUTCH RELEASE BEARING DEVICE AND MOTOR VEHICLE EQUIPPED WITH SUCH A BEARING

CROSS-REFERENCE TO RELATED APPLICATIONS

This application claims priority to French patent application no. 1552942 filed on Apr. 7, 2015, the contents of which are fully incorporated herein by reference.

TECHNOLOGICAL FIELD

The present invention relates to a clutch release bearing device used in a motor vehicle to transmit an axial force between a non-rotating part and a rotating part.

BACKGROUND OF THE INVENTION

In the automotive field, it is known to use a clutch release bearing actuated by a member that is able to move in translation in order to engage a manually controlled or automatically controlled gearbox. To this end, the clutch release bearing device provides a rolling bearing having rolling elements housed between a rotating ring and a non-rotating ring pushed by the member that is able to move in translation. Conversely, the device provides an actuating member incorporated into a clutch, made up for example of pressure plates, intended to be actuated axially by the rotating ring, the actuating member then driving rotating mechanical elements allowing torque transmission and the use of the gearbox.

Provision may be made to mount the clutch release bearing device in a fixed casing so that some of the set of constituent elements of the device are entirely immersed in a fluid, for example oil.

However, the contact between the clutch release bearing device and the actuating member can create friction, reducing the service life of the equipment and increasing the pollution generated, in particular by metal particles resulting from the friction.

Provision can thus be made to preload the bearing device with a return spring that exerts an axial force in the opposite direction to that exerted by the member that is able to move in translation on the bearing device, so as to form an axial space between the bearing device and the actuating member when they are not engaged.

SUMMARY OF THE INVENTION

The object of the present invention is to provide a novel clutch release bearing device that is able to support preloading by means of a design that is particularly simple and economical to implement.

To this end, the invention relates to a motor vehicle clutch release bearing device, this device comprising a rolling bearing that forms a member for transmitting an axial force, having a rotating ring and a non-rotating ring, between which a rolling chamber for rolling elements is defined.

In accordance with the invention, the rotating ring provides a first radial portion that is intended to come into contact with an actuating member when sufficient axial force is applied to the non-rotating ring by a member that is able to move in translation, and a second radial portion that is intended to bear against a spring that exerts axial force in the opposite direction to the axial force exerted by the member that is able to move in translation, dedicated to preloading the rolling bearing in an opposite direction to the actuating member.

By virtue of the invention, one and the same ring of the rolling bearing incorporates the functions not only of bearing against an actuating member, but also of supporting the preloading of the rolling bearing and supporting the rotation of the rolling elements.

When no axial force is exerted by the member that is able to move in translation or the axial force is insufficient, the spring pushes the rolling bearing, and in particular the rotating ring, away from the actuating member so as to reduce friction and release the actuating member. The wearing of the elements is thus reduced and this makes it possible to increase the service life thereof. In addition, the amount of dust and particles produced by friction between the actuating member, usually manufactured from carbon-containing materials, and the inner ring is reduced, making it possible to reduce the pollution produced by the device to the same extent.

According to aspects of the invention that are advantageous but not obligatory, such a bearing device may include one or more of the following features in any technically admissible combination:

The rolling elements of the rolling bearing are balls.
The rolling elements of the rolling bearing are kept more or less evenly spaced apart circumferentially by a cage.
The rotating ring provides a toroidal portion having a concave surface that forms a raceway for the rolling elements.
The toroidal portion of the rotating ring extends radially via the radial portion that is intended to come into contact with an actuating member when sufficient axial force is applied to the non-rotating ring by a member that is able to move in translation.
The toroidal portion of the rotating ring extends radially via the radial portion that is intended to bear against a spring that exerts an axial force in the opposite direction to the axial force exerted by the member that is able to move in translation, dedicated to preloading the rolling bearing in an opposite direction to the actuating member.
The toroidal portion is situated radially between the radial portion that is intended to come into contact with an actuating member and the radial portion that is intended to bear against a spring.
The radial portion intended to come into contact with an actuating member is situated radially between the toroidal portion and the radial portion that is intended to bear against a spring.
The rotating ring provides an intermediate portion between at least one of the radial portions that are intended to come into contact with an actuating member or a spring and a portion of the rotating ring, the intermediate portion making it possible to adjust the position of the rolling bearing depending on the actuating member and the spring.
The rotating ring forms a single piece.
The rotating ring provides a first part including the radial part that is intended to come into contact with an actuating member, and a second part that is intended to bear against a spring, the two parts being securely fixed.
The first part of the rotating ring also provides the toroidal portion.
The first part of the rotating ring provides retention means for the second part of the rotating ring.

The first part of the rotating ring provides an axial tubular portion and the second part of the rotating ring provides an axial flange extending from the radial portion that is intended to bear against a spring, the axial flange being secured to the internal tubular portion.

The axial flange is mounted so as to be pressed together with the axial tubular portion.

The first part of the rotating ring provides a edge and a boss; the second part provides a flange extending from the radial portion that is intended to bear against a spring, the flange having its free end housed in a space defined between the edge and the boss of the first part.

The free end of the flange provides a radial edge housed in the space defined between the edge and the boss of the toroidal portion of the first part.

The edge of the first part of the rotating ring extends from the toroidal portion.

The boss of the first part of the rotating ring is produced by pushing material provided on the surface away from the rolling elements of the toroidal portion.

The first part of the rotating ring provides a edge; the second part provides a flange extending from the radial portion that is intended to bear against a spring, the flange having its free end crimped around the edge of the first part.

The second part of the rotating ring has an external border that is wedged axially between the toroidal portion and the radial portion that is intended to come into contact with an actuating member of the rotating ring.

The radial portion that is intended to bear against a spring provides rotation prevention means for the spring.

The rotating and non-rotating rings of the rolling bearing are made of steel, for example of the type C67 S.

The second part of the rotating ring is made of a material having a coefficient of rigidity lower than that of the material from which the first part is formed.

The second part of the rotating ring is made of steel, for example of mild steel.

The rotating ring and the non-rotating ring of the rolling bearing are formed from pressed metal sheets.

The rotating ring is an inner ring of the rolling bearing and the non-rotating ring is an outer ring of the rolling bearing.

The rotating ring is an outer ring of the rolling bearing and the non-rotating ring is an inner ring of the rolling bearing.

The invention also relates to a motor vehicle equipped with a device as mentioned above for the engagement/disengagement of its gearbox.

BRIEF DESCRIPTION OF THE DRAWINGS

The invention will be more readily understood and further advantages thereof will become more clearly apparent from the following description of three embodiments of a clutch release bearing device according to the principle of the invention, this description being given purely by way of example and with reference to the appended drawings, in which.

DETAILED DESCRIPTION OF THE INVENTION

Figure 1:
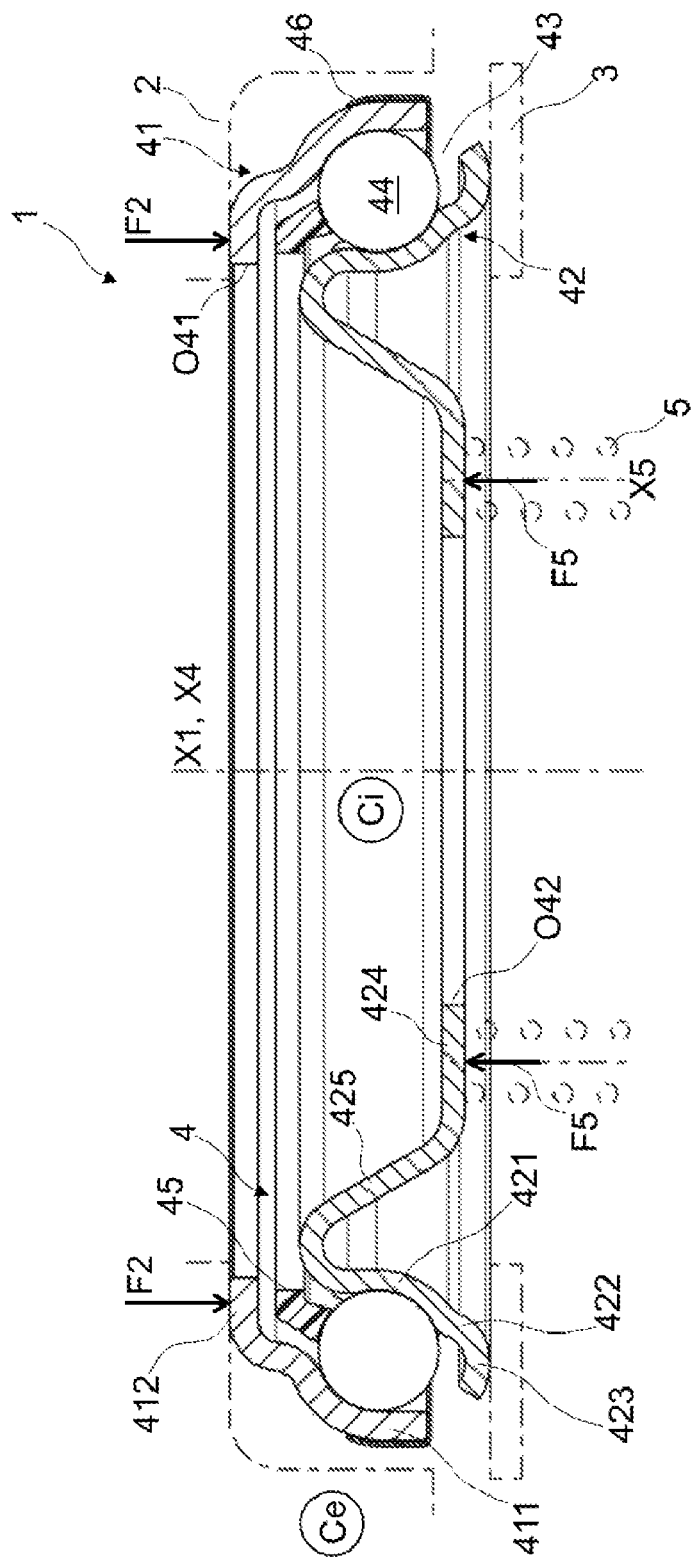
FIG. 1 is a view in axial half section of a clutch release bearing device according to a first embodiment of the invention.

The clutch release bearing device 1 shown in FIGS. 1 to 6 is intended to be mounted on a motor vehicle in order to transmit an axial force F2 exerted by a member 2 that is able to move in translation, shown by way of dot-dashed lines only in FIG. 1, to an actuating member 3, for example a pressure plate.

X1 denotes the central axis of the clutch release bearing device 1, the rotation axis of the pressure plate being coincident with X1 in normal operation of the device 1.

In the following text, to make it easier to locate the bearing 1 in space, an internal side Ci corresponding to the main axis X1 is defined, as is an external side Ce away from the axis X1 via the device 1.

Moreover, for this and the following embodiments, the adjectives "axial" and "radial" and the adverb "axially" are defined with respect to the central axis X1 of the bearing 1. Thus, an axial portion or part is parallel to the axis X1, while a radial part or portion is perpendicular to this axis and surrounds it. For example, a radial portion is provided with an internal surface oriented towards the internal side Ci of the bearing 1, and thus towards the axis X1, and with an external surface oriented away from this axis, towards the external side Ce of the bearing 1.

The bearing device 1 provides a ball bearing 4 comprising a non-rotating outer ring 41 and a rotating inner ring 42, between which a rolling chamber 43 is defined. A single row of rolling elements 44, in this case balls, is disposed in the rolling chamber 43, being kept in position by a cage 45.

The outer ring 41 and inner ring 42 are produced from pressed metal sheets.

X4 denotes the central axis of the rolling bearing 4, i.e. the relative rotation axis of the rings 41 and 42 with respect to one another. In normal operation of the device 1, the axes X1 and X4 are coincident.

The outer ring 41 provides an axial tubular portion 411, of which the surface of the internal side Ci defines a concave surface that serves as a bearing raceway for the balls 44. The tubular portion 411 extends radially towards the inside Ci of the rolling bearing 4 via a radial portion 412 substantially perpendicular to the axis X4, the inner radial edge 412 of which defines a bore O41.

The member 2 that is able to move in translation bears against this radial portion 412 so as to exert an axial force F2 in the direction of the actuating member 3.

The outer ring 41 is provided with a plate 46 comprising a radial portion directed towards the inside Ci of the rolling bearing 4, in the direction of the rolling elements 44 but without coming into contact therewith. Such a plate 46 makes it possible for the rolling bearing 4 to be retained if the rings 41, 42 of the rolling bearing 4 separate or in the event of excessive swivelling.

The inner ring 42 provides an annular toroidal portion 421, of which the surface of the external side Ce defines a concave surface that serves as a bearing raceway for the balls 44.

In accordance with a first embodiment shown in FIG. 1, the toroidal portion 421 extends axially via an intermediate portion 422 of frustoconical shape, itself extending radially towards the outside Ce of the rolling bearing 4 via an annular external radial portion 423 substantially perpendicular to the axis X4.

The external radial portion 423 of the rotating inner ring 42 is intended to come into contact with the actuating member 3 when sufficient axial force F2 is applied to the non-rotating outer ring 41 by the member 2 that is able to move in translation.

The inner ring likewise provides an internal radial portion 424 directed radially towards the inside Ci of the rolling bearing 4, this internal radial portion 424 being connected to the toroidal portion 421 by an intermediate portion 425. The inner radial edge of the internal radial portion 424 defines a bore O42.

The internal radial portion 424 of the rotating inner ring 42 is intended to bear against a spring 5 having an axis X5 coaxial with the axis X4 of the rolling bearing 4.

Such a spring 5 exerts an axial force F5 in the opposite direction to the axial force F2 exerted by the member 2 that is able to move in translation, so as to preload the rolling bearing 4 in an opposite direction to the actuating member 3. When no axial force F2 is exerted by the member 2 that is able to move in translation or the axial force F2 is insufficient, the spring 5 pushes the rolling bearing 4, and in particular the inner ring 42, away from the actuating member 3 so as to reduce friction. The wearing of the elements is thus reduced and this makes it possible to increase the service life thereof. In addition, the amount of dust and particles produced by friction between the actuating member 3, usually manufactured from carbon-containing materials, and the inner ring 42 is reduced, making it possible to reduce the pollution produced by the device 1 to the same extent.

The intermediate portion 425 between the toroidal portion 421 and the internal radial portion 424 of the inner ring provides a first convex part extending from the toroidal portion and then a frustoconical portion connected to the internal radial portion 424. The length and the inclination that are given to the intermediate portions 422 and 425 make it possible to adjust the position of the rolling bearing 4 depending on the actuating member 3 and the spring 5.

According to a variant that is not shown, the internal radial portion 424 provides a rotation prevention means with the spring 5. This rotation prevention means can be realized, for example, by a boss that is provided on the internal radial portion 424 and interacts with the first coil of the spring 5.

Figure 2:
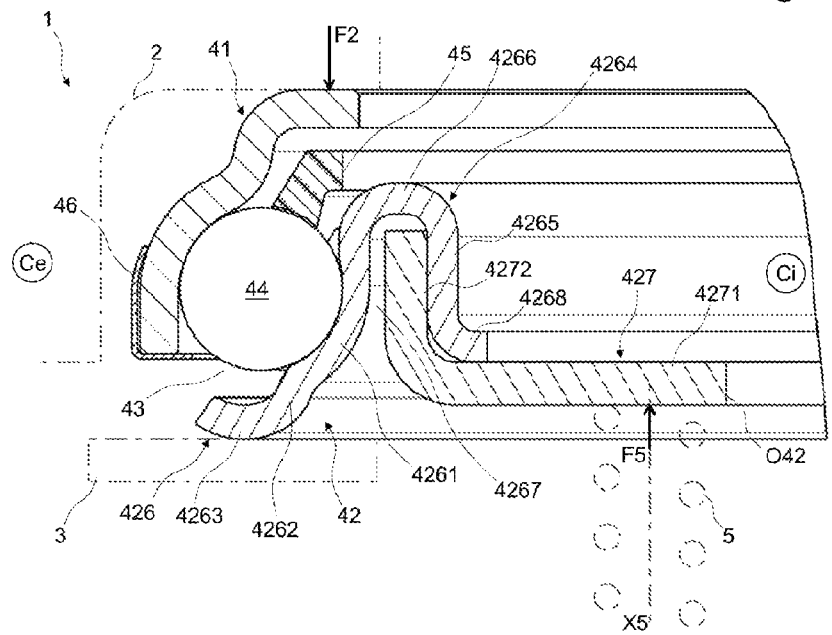
FIG. 2 is a view in axial half section of a clutch release bearing device according to a second embodiment of the invention.

A second embodiment illustrated in FIG. 2, in which identical elements have the same references, differs from the first embodiment in that the inner ring 42 provides a first part 426 that ensures contact with the balls 44 and the actuating member 3 and a second part 427 that ensures contact with the spring 5, the two parts 426 and 427 being secured together.

The first part 426 of the inner ring 42 provides an annular toroidal portion 4261, of which the surface of the external side Ce defines a concave surface that serves as a bearing raceway for the balls 44. The toroidal portion 4261 extends axially via an intermediate portion 4262 of frustoconical shape, itself extending radially towards the outside Ce of the rolling bearing 4 via an annular external radial portion 4263 substantially perpendicular to the axis X4, the external radial portion 4263 of the rotating inner ring 42 being intended to come into contact with the actuating member 3 when sufficient axial force F2 is applied to the non-rotating outer ring 41 by the member 2 that is able to move in translation.

The first part 426 likewise provides retention means 4264 for the second part 427 of the inner ring 42. The retention means 4264 consist of an internal tubular portion 4265 connected to the toroidal portion 4261 by a convex portion 4266 in the form of an inverted "U". The internal tubular portion 4265 and the toroidal portion 4261 define a free radial space 4267 between one another. The free end of the internal tubular portion 4265 extends radially towards the inside Ci of the rolling bearing 4 via a curved edge 4268.

The second part 427 of the inner ring 42 provides a radial portion 4271 directed towards the inside Ci of the rolling bearing 4. The surface of the internal side Ci of the internal radial portion 4271 defines a bore O42 for the inner ring 42. The second part 427 of the inner ring 42 likewise provides an axial flange 4272 extending axially from the radial portion 4271, away from the bore O42. This axial flange 4272 is housed in a free radial space 4267 defined between the internal tubular portion 4265 and the toroidal portion 4261 of the first part 426 of the inner ring 42.

The first part 426 and second part 427 of the inner ring 42 are secured together by the retention means 4264 of the first part 426 and the axial flange 4272 of the second part 427.

According to FIG. 2, which illustrates this second embodiment, the axial flange 4272 is mounted so as to be pressed together with the tubular portion 4265, thereby ensuring the axial retention of the first part 426 and second part 427 of the inner ring 42 and that these parts rotate as one. It is possible to conceive of any other appropriate means for securing the axial flange 4272 and the tubular portion 4265, for example deformation, welding, adhesive bonding, etc. The second part 427 is then inserted into the first part 426 until the radial portion 4271 of the second part 427 comes into axial abutment against the edge 4268 of the first part 426.

The radial portion 4271 of the second part 427 of the inner ring 42 of this second embodiment of the invention has the same functionality as the internal radial portion 424 of the first embodiment.

Advantageously, the second part 427 is made of a material with a coefficient of hardness less than that of the first part 426, for example mild steel.

Figure 3:
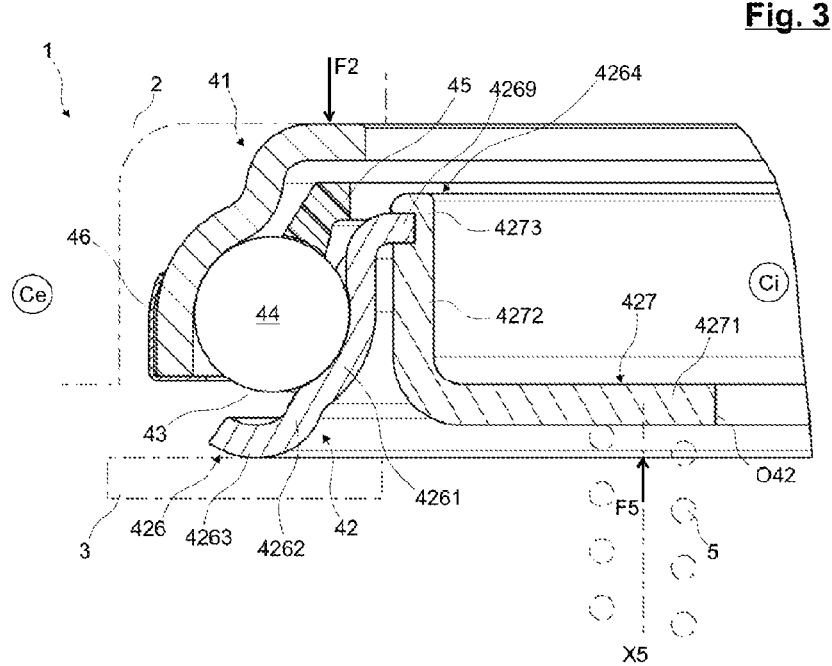
FIG. 3 is a view in axial half section of a clutch release bearing device according to a third embodiment of the invention.

A third embodiment illustrated in FIG. 3, in which identical elements have the same references, differs from the second embodiment by way of the retention between the first part 426 and second part 427 of the inner ring 42.

The toroidal portion 4261 of the first part 426 of the inner ring 42 extends radially towards the inside Ci of the rolling bearing 4 via a edge 4269.

The axial flange 4272 of the second part 427 of the inner ring provides a free end 4273 which is crimped radially around the edge 4269 of the inner ring 42.

More specifically, the free end 4273 is initially axial and then is positioned next to the edge 4269 so as to be in axial contact therewith. The free end 4273 is then curbed by crimping so as to axially surround the edge 4269, thereby ensuring axial retention of the first part 426 and the second part 427 of the inner ring 42 and that these parts rotate as one.

Figure 4:
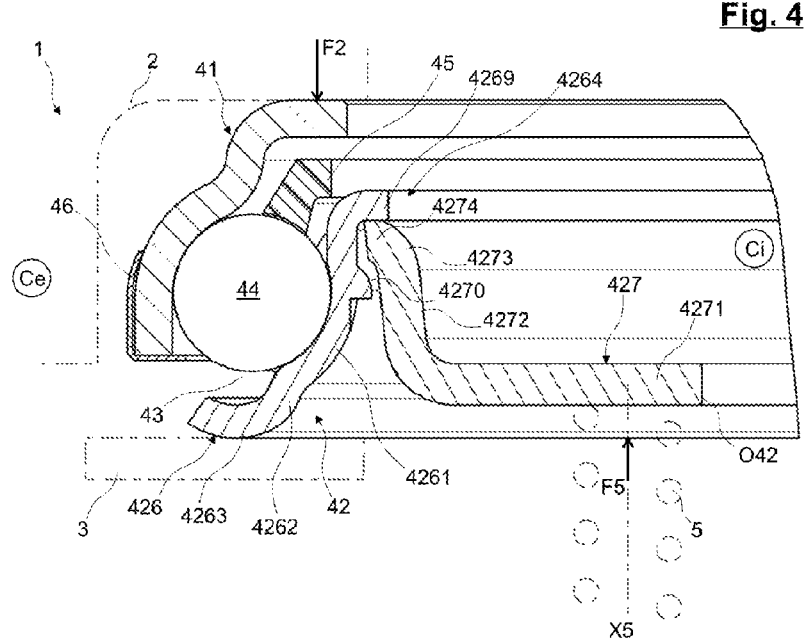
FIG. 4 is a view in axial half section of a clutch release bearing device according to a fourth embodiment of the invention.

A fourth embodiment illustrated in FIG. 4, in which identical elements have the same references, differs from the third embodiment by way of the retention between the first part 426 and second part 427 of the inner ring 42.

The toroidal portion 4261 of the first part 426 of the inner ring 42 extends radially towards the inside Ci of the rolling bearing 4 via a edge 4269. A boss 4270 is provided on the surface of the internal side Ci of the toroidal portion 4271, for example by spinning of material. The boss 4270 may be annular or consist of a plurality of bosses that are distributed circumferentially, in a regularly or irregularly spaced-apart manner.

The axial flange 4272 of the second part 427 of the inner ring provides a free end 4273, the free end being provided with a edge 4274 directed radially towards the outside Ce of the rolling bearing 4.

Once the second part 427 has been positioned coaxially in the first part 426 of the inner ring 42, and more particularly in the bore defined by the toroidal portion 421, the axial flange 4272 is pushed away radially towards the first part 426 such that the end 4273 of the axial flange 4272 is housed radially between the edge 4269 and the boss 4270. The edge 4274 of the flange 4272 ensures axial retention with the boss 4270.

Such a securing means between the first part 426 and second part 427 of the inner ring 42 has the advantage of allowing a degree of freedom in relative rotation about the axis X1 between the first part 426 and second part 427, unlike the second and third embodiments. This may be advantageous depending on the configuration of the application.

Figure 5:
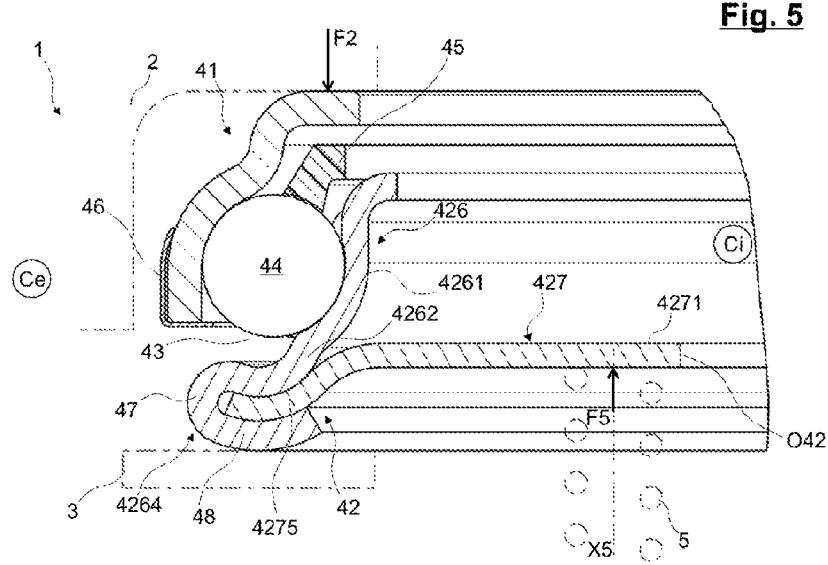
FIG. 5 is a view in axial half section of a clutch release bearing device according to a fifth embodiment of the invention.

A fifth embodiment illustrated in FIG. 5, in which identical elements have the same references, differs from the second to fourth embodiments by way of the retention between the first part 426 and second part 427 of the inner ring 42.

The first part 426 of the inner ring 42 provides an annular toroidal portion 4261, of which the surface of the external side Ce defines a concave surface that serves as a bearing raceway for the balls 44. The toroidal portion 4261 extends axially via an intermediate portion 4262 of frustoconical shape, itself extending via a curved portion 47 that defines a radial portion 48 directed radially towards the inside Ci of the rolling bearing 4.

The second part 427 of the inner ring 42 provides a radial portion 4271 directed towards the inside Ci of the rolling bearing 4. The surface of the internal side Ci of the internal radial portion 4271 defines a bore O42 for the inner ring 42.

The radial portion 4271 provides an external end 4275 towards the outside Ce of the rolling bearing. The external end is wedged axially between the intermediate portion 4262 and the radial portion 48 of the first part 426 by the curved portion 47, thereby ensuring axial retention of the first part 426 and second part 427 of the inner ring 42 and that these parts rotate as one. This can be realized by successive crimping operations using suitable dies and punches.

The radial portion 48 of the first part is intended to come into contact with the actuating member 3 when sufficient axial force F2 is applied to the non-rotating outer ring 41 by the member 2 that is able to move in translation.

Figure 6:
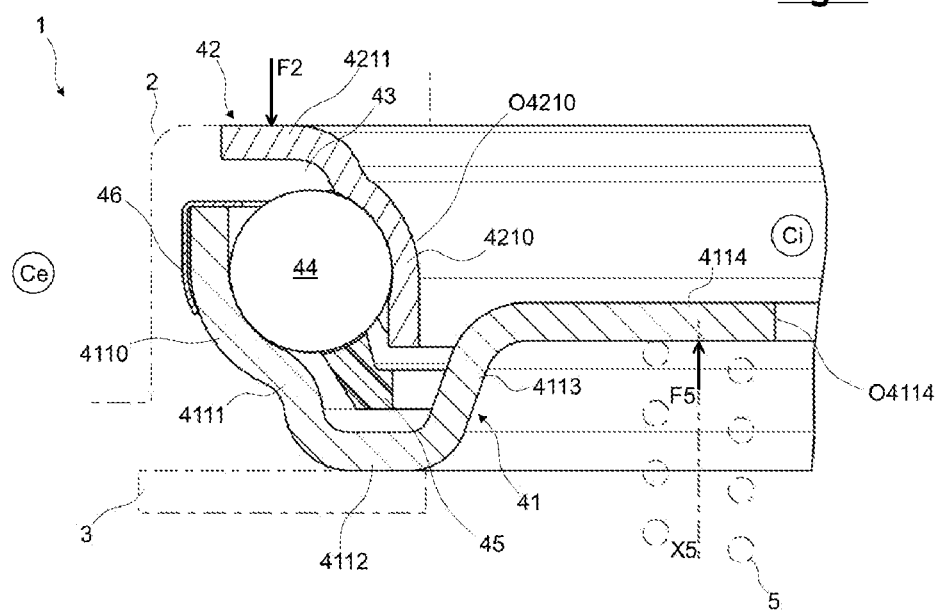
FIG. 6 is a view in axial half section of a clutch release bearing device according to a sixth embodiment of the invention.

A sixth embodiment illustrated in FIG. 6, in which identical elements have the same references, differs from the preceding embodiments in that the outer ring 41 of the rolling bearing 4 is now the rotating ring and the inner ring 42 is the non-rotating ring.

The inner ring 42 is the non-rotating ring and provides an axial tubular portion 4210, of which the surface of the external side Ce defines a concave surface that serves as a bearing raceway for the balls 44, the internal surface of the axial tubular portion defining a bore O4210. The tubular portion 4210 extends radially towards the outside Ce of the rolling bearing 4 via a radial portion 4211 substantially perpendicular to the axis X4.

The member 2 that is able to move in translation bears against this radial portion 4211 so as to exert an axial force F2 in the direction of the actuating member 3.

The outer ring 41 is the rotating ring and provides an annular toroidal portion 4110, of which the surface of the internal side Ci defines a concave surface that serves as a bearing raceway for the balls 44. The toroidal portion 4110 extends axially via an intermediate portion 4111, itself extending radially towards the inside Ci of the rolling bearing 4 via a radial contact portion 4112 substantially perpendicular to the axis X4.

The radial portion 4112 of the rotating outer ring 41 is intended to come into contact with the actuating member 3 when sufficient axial force F2 is applied to the non-rotating outer ring 42 by the member 2 that is able to move in translation.

The outer ring likewise provides an internal radial portion 4114 directed radially towards the inside Ci of the rolling bearing 4, this internal radial portion 4114 being connected to the radial contact portion 4112 by an intermediate portion 4113. The inner radial edge of the internal radial portion 4114 defines a bore O4114.

The internal radial portion 4114 of the rotating outer ring 41 is intended to bear against the spring 5 having an axis X5 coaxial with the axis X4 of the rolling bearing 4.

The intermediate portion 4113 between the radial portion 4112 for contact with the actuating member 3 and the internal radial portion 4114 has a frustoconical shape and makes it possible to define an axial offset between the two radial portions 4112 and 4114. The length and the inclination that are given to the intermediate portion 4113 make it possible to adjust the position of the rolling bearing 4 depending on the actuating member 3 and the spring 5. Alternatively, it is possible for the two radial portions 4114 and 4112 to form only a single radial portion of the outer ring 41, without an intermediate portion 4113 or an offset, if the application so requires.

The invention is described above in the case of the use of a ball bearing. It is also usable with other rolling elements, in particular rollers or needles.

The technical features of the embodiments and variants envisaged above can be combined with one another.

The invention claimed is:

1. A motor vehicle clutch release bearing device having a central axis, comprising:
   a rolling bearing for transmitting an axial force, having a rotating inner ring providing an inner raceway and a non-rotating outer ring providing an outer raceway located radially outwardly relative to the inner raceway, between which a rolling chamber for rolling elements is defined, the rotating inner ring rotating about the central axis, wherein
   the rotating inner ring provides:
      a first radial portion that is intended to come into contact with an actuating member when sufficient axial force (F2) is applied to the non-rotating outer ring by a member that is able to move in translation and parallel to the central axis,
      a second radial portion that is intended to bear against a spring that exerts an axial force (F5) in the opposite direction to the axial force (F2) exerted by the member that is able to move in translation, dedicated to preloading the rolling bearing in an opposite direction to the actuating member, an annular toroidal portion defining a raceway for the rolling elements, the first radial portion being located radially outside of the annular toroidal portion, the second radial portion being located radially inside of the annular toroidal portion and configured to engage the spring which extends past the actuating member to engage a surface of the second radial portion which is perpendicular to the central axis and which faces away from both the non-rotating outer ring and the member.

2. The motor vehicle clutch release bearing device claim 1, wherein, when viewed in cross section, the rotating inner ring forms a U-shape between the annular toroidal portion and the second radial portion.

3. The motor vehicle clutch release bearing device according to claim 2, wherein the rotating inner ring further comprises an intermediate portion disposed between the actuating member and the annular toroidal portion, the intermediate portion making it possible to adjust the position of the rolling bearing depending on the actuating member and the spring.

4. The motor vehicle clutch release bearing device according to claim 1, wherein the rotating inner ring is a single piece.

5. The motor vehicle clutch release bearing device according to claim 1, wherein, when viewed in cross section, the rotating inner ring forms a U-shape between the annular toroidal portion and the second radial portion, the U-shape forming a concave shape which faces away from the non-rotating outer ring.

6. The motor vehicle clutch release bearing device according to claim 5, wherein the non-rotating outer ring includes a plate which extends radially inwardly from an end of the non-rotating outer ring proximate to the actuating member, the plate is configured to engage the rolling bearing when the rotating inner ring and the non-rotating outer ring move away from each other.

7. The motor vehicle clutch release bearing device according to claim 6, wherein the rotating inner ring is formed by a first part and a second part which are attached to each other, the first part of the rotating inner ring further comprises an edge and a boss; the second radial part further comprises a flange that is intended to bear against the spring, the flange of the second part having a free end housed in a space defined between the edge and the boss of the first part.

8. The motor vehicle clutch release bearing device according to claim 6, wherein the rotating inner ring is formed by a first part and a second part which are attached to each other, the first part of the rotating inner ring further comprises an edge; the second part further comprises a flange extending from the radial portion that is intended to bear against the spring, the flange having a free end crimped around the edge of the first part.

* * * * *